US006685159B1

(12) United States Patent
Schnell

(10) Patent No.: US 6,685,159 B1
(45) Date of Patent: Feb. 3, 2004

(54) WIRELESS, INTRINSICALLY SAFE VALVE

(75) Inventor: Richard E. Schnell, Oswego, IL (US)

(73) Assignee: Ross Operating Valve Company, Troy, MI (US)

( * ) Notice: Subject to any disclaimer, the term of this patent is extended or adjusted under 35 U.S.C. 154(b) by 26 days.

(21) Appl. No.: 09/891,487

(22) Filed: Jun. 25, 2001

Related U.S. Application Data

(63) Continuation of application No. PCT/US01/08869, filed on Mar. 20, 2001.

(60) Provisional application No. 60/191,066, filed on Mar. 21, 2000.

(51) Int. Cl.[7] .......... F16K 31/02

(52) U.S. Cl. .......... 251/59; 251/29; 251/129.04; 251/129.06

(58) Field of Search .......... 251/129.04, 129.06, 251/129.07, 11, 29, 59; 700/282; 323/906

(56) References Cited

U.S. PATENT DOCUMENTS

| | | | | |
|---|---|---|---|---|
| 3,954,046 A | | 5/1976 | Stillhard | |
| 4,328,831 A | * | 5/1982 | Wolff | 137/625.31 |
| 4,399,105 A | * | 8/1983 | Tilgner et al. | 264/40.1 |
| 4,412,355 A | | 10/1983 | Terbrack et al. | |
| 4,443,853 A | * | 4/1984 | Maciolek et al. | 244/17.13 |
| 5,543,627 A | | 8/1996 | Huggins | |
| 5,570,716 A | | 11/1996 | Kamen et al. | |
| 5,706,852 A | | 1/1998 | Deville | |
| 5,709,245 A | * | 1/1998 | Miller | 137/625.62 |
| 5,753,136 A | * | 5/1998 | Tani et al. | 252/62.9 PZ |
| 5,875,818 A | * | 3/1999 | Takats et al. | 137/625.64 |
| 5,975,139 A | * | 11/1999 | Carroll et al. | 137/625.6 |
| 6,302,495 B1 | * | 10/2001 | Peltz | 251/129.06 |

* cited by examiner

*Primary Examiner*—Gene Mancene
*Assistant Examiner*—Patrick Buechner
(74) *Attorney, Agent, or Firm*—Harness, Dickey & Pierce

(57) ABSTRACT

A valve system (10) that employs a piezo-electric element (38) to activate a fluid flow valve (18) so as to use a minimal amount of electrical energy. The piezo-electric element (38) activates a pilot pressure valve (36), which allows a control fluid to pass to a main control valve (44). The control fluid causes the main control valve (44) to activate a working element (16), which in turn operates the fluid flow valve (18). A switching assembly (70) is employed to activate the piezo-electric element (38). The switching assembly (70) can include various types of switching devices, such as RF switching devices, optical switching devices, infrared switching devices and low voltage electrical switching devices.

22 Claims, 5 Drawing Sheets

WIRELESS, INTRINSICALLY SAFE VALVE

This application is a continuation of International Serial No. PCT/US01/08869, International Filing Date of Mar. 20, 2001, which claims the benefit of Provisional Ser. No. 60/191,066, filed on Mar. 21, 2000, the disclosures of which are incorporated herein by reference.

BACKGROUND

FIELD OF THE INVENTION

The present invention relates generally to intrinsically safe valves and, more particularly, to valves that employ a piezo-electric element that operates using minimal electrical energy.

Many industries utilize and/or manufacture flammable chemicals. These industries must take particular caution to prevent ignition of such chemicals in order to prevent fires or explosions. Chemical management systems require significant consideration towards minimizing the potential for igniting such chemicals. Chemical management systems typically are designed so that arcing and sparks which often result from connecting and disconnecting electrical circuits is minimized. Presently, such chemical management systems utilize expensive wiring and switch elements in order to achieve this goal.

One particular example of such a chemical management system utilizes solenoid valves in order to displace a valve element to control the flow of flammable chemicals. Present systems utilize expensive low spark implementations. These implementations include sparkless wiring and sparkless switches which are expensive because of the significant shielding of the wiring and sealing of the switches. Even though these switches typically operate at a signal voltage level rather than a higher, working voltage levels, minimal sparks in a highly flammable environment can present extremely hazardous situations.

Thus, there is a need for providing an intrinsically safe valve which reduces the overall cost of valves in a chemical management system.

SUMMARY OF THE INVENTION

In accordance with the teachings of the present invention, a valve system is disclosed that employs a low voltage element, such as a piezo-electric element, to activate a fluid flow valve so as to use a minimal amount of electrical energy. In one embodiment, the piezo-electric element activates a pilot pressure valve, which allows a control fluid to pass to a main control valve. The control fluid causes the main control valve to activate a working element, which is turn operates the fluid flow valve. A switching assembly is employed to activate the piezo-electric element. The switching assembly can include various types of switching devices, such as RF switching devices, optical switching devices, infrared switching devices and low voltage electrical switching devices, to allow the valve to be controlled from a remote location.

For a more complete understanding of the invention, its objects and advantages, reference should be made to the following specification and to the accompanying drawings.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The drawings, which form an integral part of the specification, are to be read in conjunction therewith, and like reference numerals are employed to designate identical components in the various view.

DETAILED DESCRIPTION OF THE PREFERRED EMBODIMENTS

The following description of the preferred embodiment(s) is merely exemplary in nature and is in no way intended to limit the invention, its application, or uses.

Figure 1:
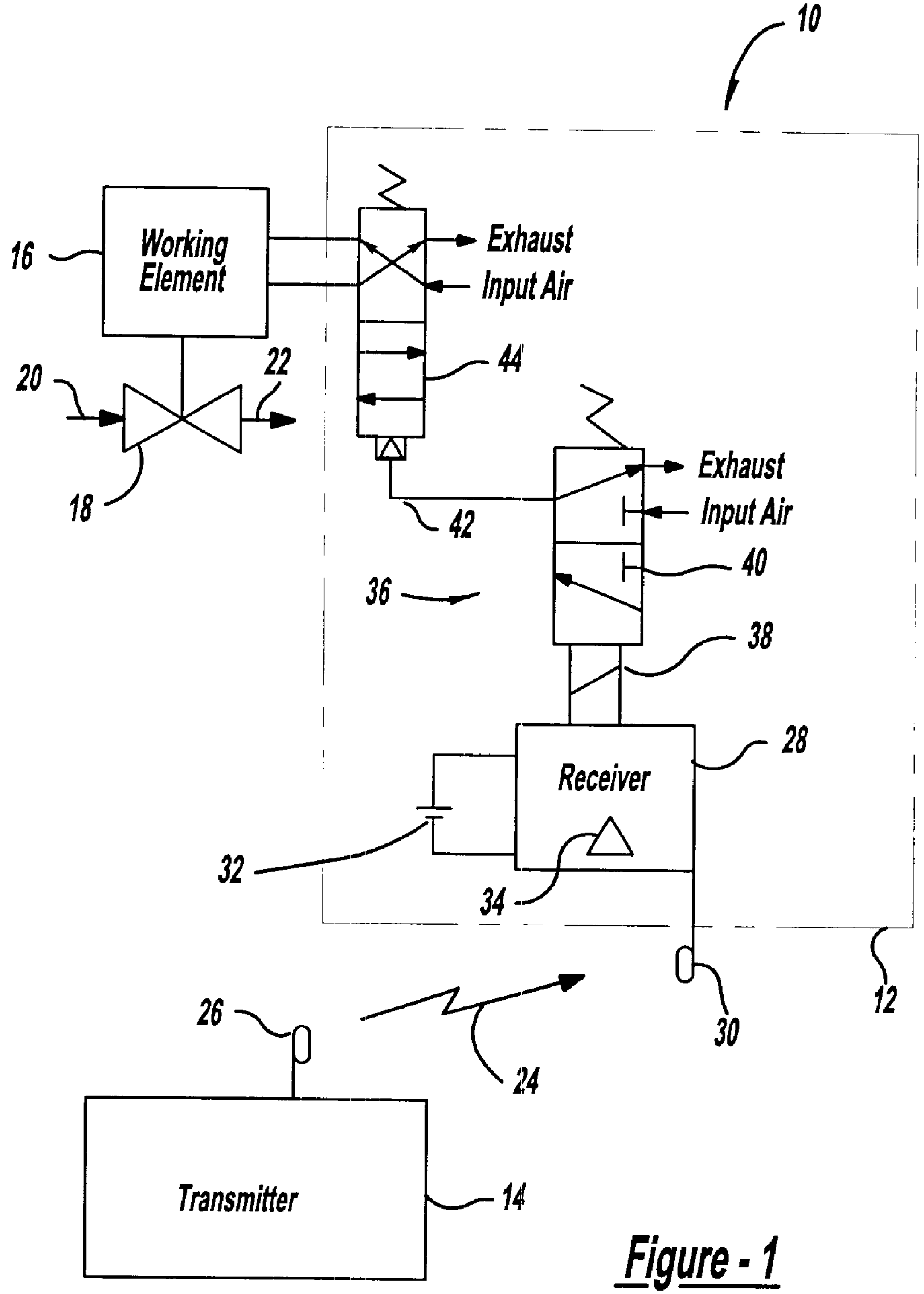
FIG. 1 is a schematic block diagram of an intrinsically safe valve that is activated by an RF signal, according to an embodiment of the present invention.

FIG. 1 is a plan view of an intrinsically safe valve system 10 according to the invention. The valve system 10 includes a valve activation assembly 12, a transmitter 14, a working element 16 and a fluid valve 18. The transmitter 14 transmits a signal 24 from an antenna 26 that is received by an antenna 30 associated with the valve assembly 12. In this embodiment, the signal 24 is an RF signal, but as will be discussed in more detail below, other signals can be used, such as optical signals, infrared signals, and low voltage signals. The signal 24 may be encoded by the transmitter 14 so that only a particular valve assembly 12 operates in response to the signal 24. Thus, the valve assembly 12 may be addressable to distinguish a particular valve assembly 12 from other valve assemblies. When the valve assembly 12 receives the signal 24, it activates the working element 16, which opens or closes the fluid valve 18 depending on its normal state. The valve 18 controls the flow of chemicals between a first side 20 and a second side 22. The valve 18 can be any type of actuator that operates under low voltage. Particularly, the valve 18 can be any actuation device that can benefit from the system described herein.

The receiver 28 includes a detector 34 that detects the signal 24 from the antenna 30. A battery 32 provides electrical energy to the receiver 28. The receiver 28 includes a non-contacting switch 34 responsive to the signal 24 from the antenna 30. If the transmitter 14 encodes the signal 24, the non-contacting switch 34 responds only if the receiver 28 is the properly addressed receiver.

The receiver 28, through non-contacting switch 34, outputs an electrical signal to a pilot valve 36. The pilot valve 36 includes a piezo-electric switch assembly 38 attached to a valve body 40 of the valve 36. The switch assembly 38 includes a piezo-electric element whose structural configuration changes in response to a voltage, as is well understood in the art. The piezo-electric element can be any piezo element suitable for the purposes described herein. In alternate embodiments, the piezo-electric element can be other types of low voltage elements suitable for the purposes described herein, such as those that employ bending element technology, such as ceramic elements. The valve 36 is a two position valve which supplies input air at a pilot pressure to a pilot line 42. The assembly 38 includes a baffle (not shown) which deflects upon application of a voltage. Deflection of the baffle opens a small orifice to allow air at the pilot pressure to be applied to the pilot line 42, which is then applied to a main spool or poppet valve 44. Preferably, the pilot valve 36 is embodied as a commercial available valve.

The main valve 44 controls application of input air and exhaust to the working element 16. In particular, upon application of the pilot pressure from the pilot line 42, the main valve 44 applies input air to displace the working element 16. The working element 16 may be embodied as a pneumatic, rotary operator for the valve 18. Accordingly, the valve 18 may be embodied as a butterfly valve so that displacement of the working element 16 opens and closes the valve 18. Upon removal of the electrical signal output by the receiver 28, the pilot valve 36 cuts off the supply of pilot pressure to the pilot line 42. This in turn displaces the main valve 44 to a deactuated position, which displaces the working element 16 to its initial position, thereby closing the valve 18.

Figure 2:
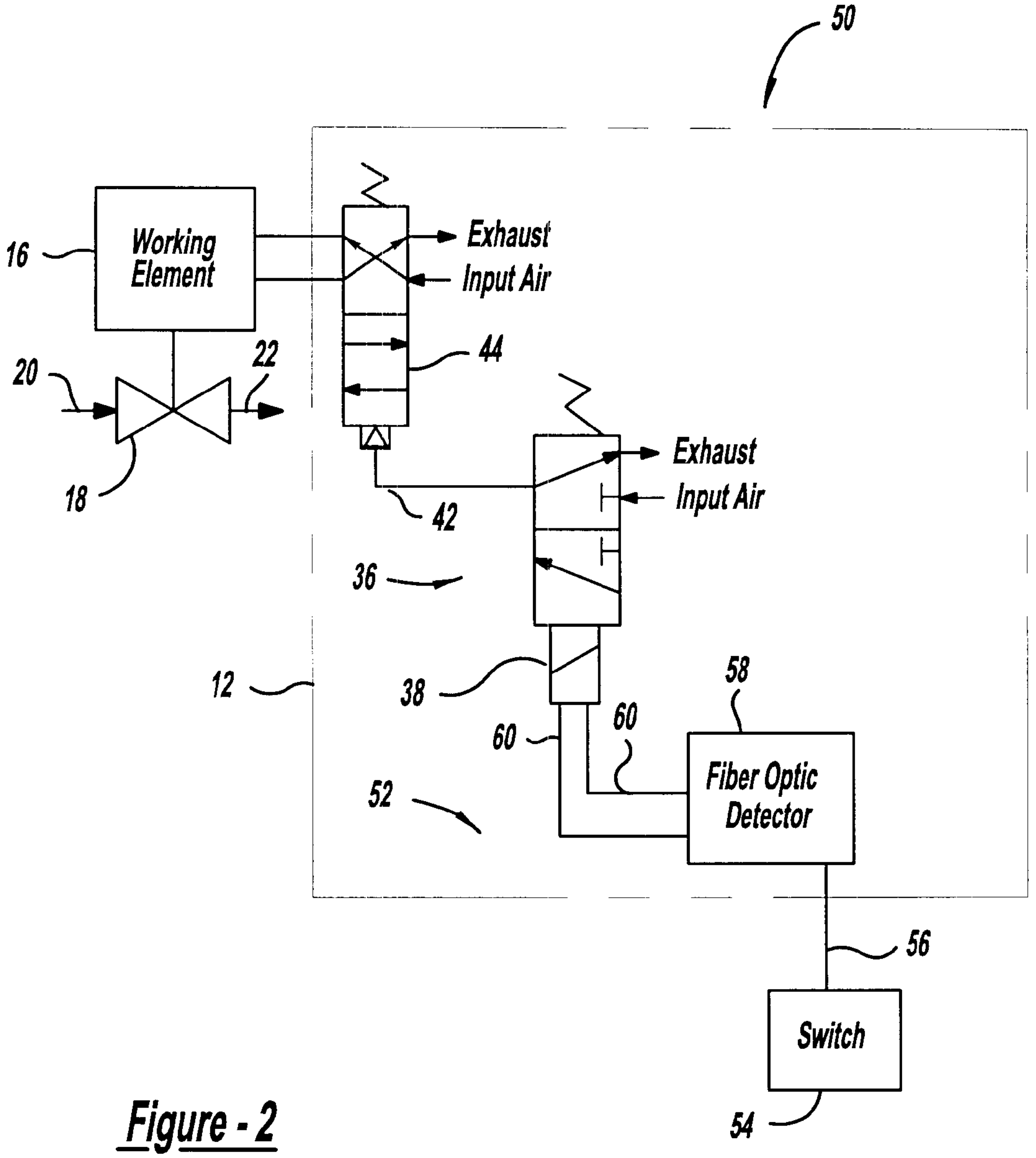
FIG. 2 is a schematic block diagram of an intrinsically safe valve that is activated by an optical signal, according to another embodiment of the present invention.

FIG. 2 depicts an intrinsically safe valve system 50, according to another embodiment of the present invention. The valve system 50 is arranged similarly to the valve system 10, and like reference numerals will be used to designate like elements. Such like elements will not be described with respect to FIG. 2 as they operate as described with respect to FIG. 1.

Of particular interest in the system 50 is the actuation technique for operating the pilot valve 36. In particular, an optical actuation system 52 replaces the transmitter 14 and the receiver 28 of the system 10. The system 52 includes a fiber optic switch 54 that outputs an optical signal on a fiber optic cable 56. The fiber optic cable 56 applies the optical signal to a fiber optic detector 58. The fiber optic detector 58 converts the optical signal from the switch 54 to a voltage for operating the assembly 38 of the pilot valve 36. The fiber optic detector 58 outputs the electrical signal on conductors 60.

The above-described embodiments offer several advantages. In conventional systems, where an operating switch is located remotely from the actual valve, an electrical conductor must be provided between the switch and the valve. Routing these electrical conductors can be expensive in both time and materials, as intrinsically safe systems require explosion-proof wiring. The subject invention, however, eliminates the need for routing electrical conductors, because the transmitter 14 and the receiver 28 need only to electromagnetically communicate without being directly connected by electrical conductors. Thus, the subject invention provides a significant cost savings.

Further, utilizing a piezo-electric element and the pilot valve 36 eliminates the opportunity for arcing due to electrical switch connection and disconnection. Only a minimal amount of electrical energy is needed to actuate the pilot valve 36, thus providing an intrinsically safe valve system. Further yet, because the receiver 28 and the assembly 38 only require a minimal amount of energy, the battery 32 provides substantial battery life for operating the valve system 10 over an extended period of time. With respect to FIG. 2, the battery 32 may be eliminated because the optical signal provide sufficient voltage for operating the assembly 38.

Figure 3:
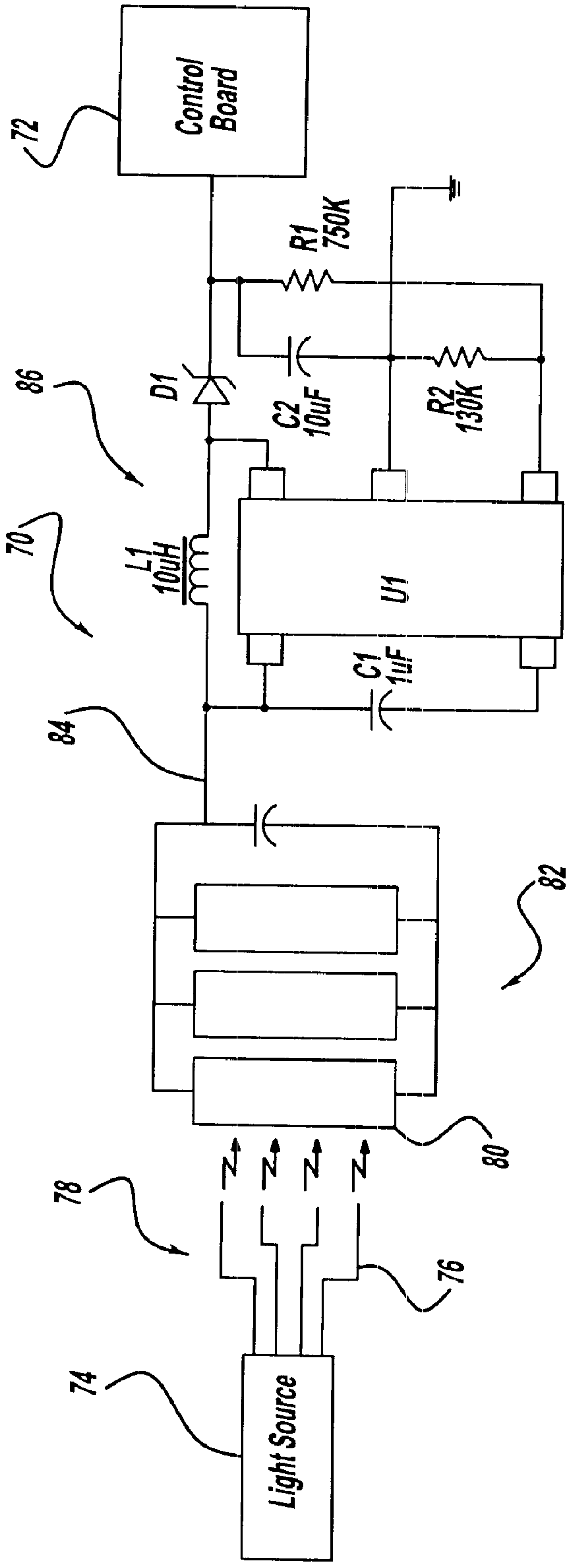
FIG. 3 is a schematic block diagram of a switching system for a valve assembly that employs an optical switch device, according to another embodiment of the present invention.

FIG. 3 is a schematic block diagram of a valve switching system 70 that can replace certain switching devices of the valve systems 10 and 50, as will become apparent from the discussion herein. Particularly, the valve switching system 70 can replace the transmitter 14 and the receiver 28 in the system 10, and replace the optical switch 54 and the fiber optic detector 58 in the system 50. The pilot valve 36, the main valve 44, the working element 16 and the fluid valve 18 would operate in the manner discussed above. The system 70 includes a control board 72 that controls the piezo-electric element within the assembly 38.

The valve 18 is open or closed, depending on its normal position, by an optical signal from a light source 74. The light source 74 can be any selectively activated light source suitable for the purposes described herein. The optical signal generated by the light source 74 propagates down optical fibers 76 arranged in a fiber bundle 78. Light emitted from the ends of the fibers 76 opposite the source 74 is received by a plurality of solar cells 80 arranged in a cell bank 82. The solar cells 80 convert the optical energy to an electrical signal that is provided on line 84. The electrical signal on line 84 is amplified by a DC-DC converter circuit 86 to amplify the signal level suitable for a particular application. In this embodiment, the DC-DC converter circuit 86 amplifies the signal level to 7.5 volts. The converter circuit 86 is shown by way of a non-limiting example in that any amplifier circuit suitable for the purposes described herein can be used. The amplified electrical signal on line 84 is then sent to the control board 72 that activates the piezo-electric element to switch the pilot valve 36 in the manner as discussed above. The solar cells 80, the converter circuit 86 and the control board 72 could be internal to the assembly 38.

Figure 4:
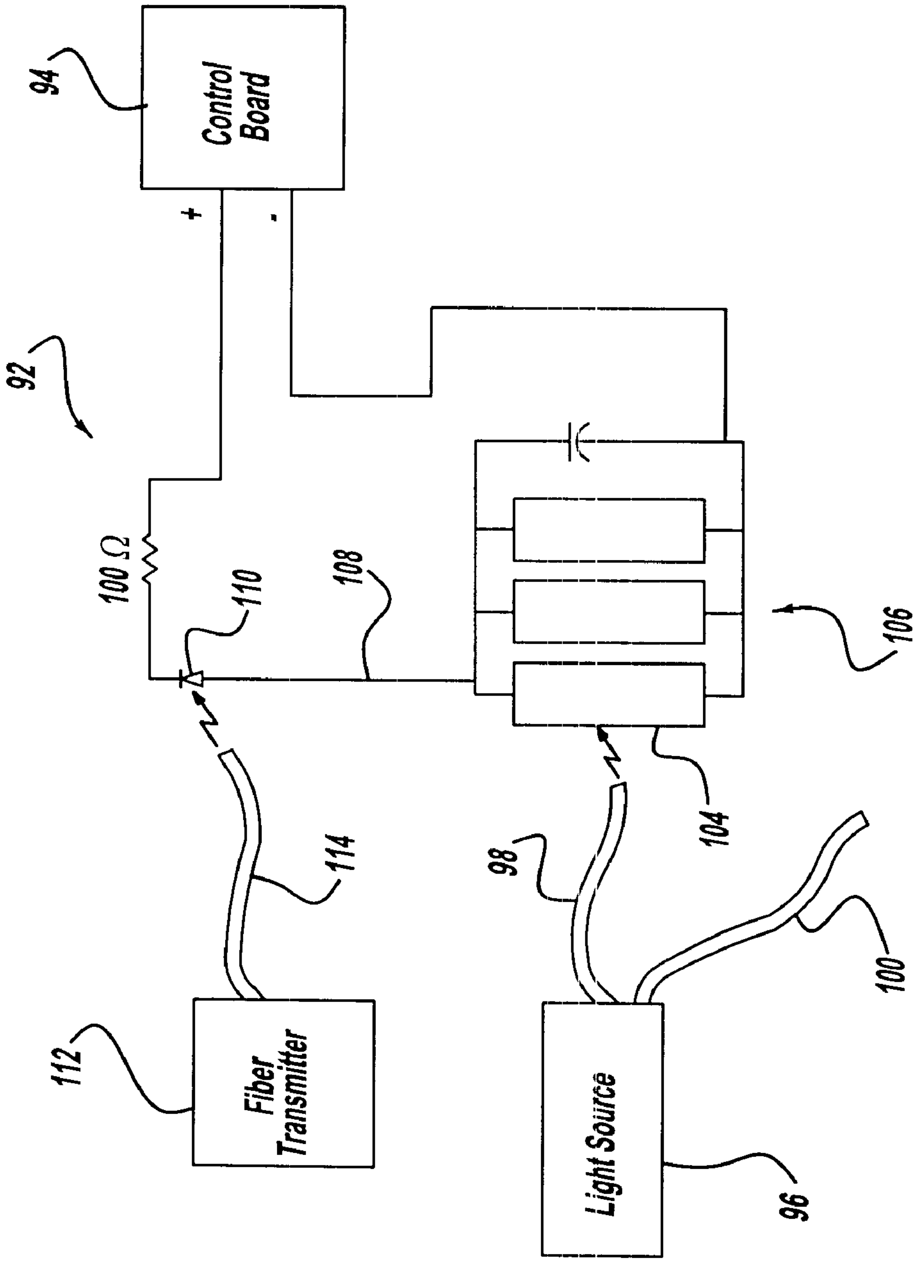
FIG. 4 is a schematic block diagram of a switching system for a valve assembly that employs an optical switch device, according to another embodiment of the present invention.

FIG. 4 is a schematic block diagram of a valve switching assembly 92 that is a variation of the switching assembly 70 discussed above. The switching assembly 92 powers a control board 94 to control the piezo-electric element within the assembly 38. In this embodiment, a 1.2 volt signal is used to control the piezo-electric element. The system 92 has particular application where a single light source powers many low voltage valve assemblies, and a separate low power optical signal is used to independently control each separate valve.

In this embodiment, a light source 96 provides an optical signal on a plurality of optical fibers 98 and 100, where the optical fiber 98 powers the control board 94 and the fiber optical cable 100 powers another valve switching assembly (not shown). The light source 96 can be any light source capable of providing optical signals to a plurality of switching assemblies consistent with the discussion herein. The light source 96 controls two separate valve switching assemblies in this embodiment, but as will be appreciated by those skilled in the art, more optical fibers connected to the light source 96 can be provided to control more valve switching assemblies. The light source 96 is maintained on so optical power is continually available to any of the several valve switching assemblies that may at any time require optical power.

The optical signal on the fiber cable 98 that is emitted from an end of the cable 98 opposite the source 90 is received by a plurality of solar cells 104 arranged in a solar cell bank 106. The solar cells 104 convert the light energy to electrical energy available on line 108. A photodiode 110 is positioned in the electrical line 108, and conducts when it receives an optical signal. When the valve 18 is to be activated, a fiber transmitter 112, such as an LED, is activated to provide an optical signal on a fiber optical cable 114. The photodiode 110 receives the light from an end of the cable 114 opposite the transmitter 112, and conducts so that the electrical signal generated by the solar cells 104 activates the control board 94. The control board 94, in turn, activates the piezo-electric element in the assembly 38 to control the pilot valve 36, as discussed above. The solar cells 104, the photodiode 110 and the control board 94 can be internal to the assembly 38.

Figure 5:
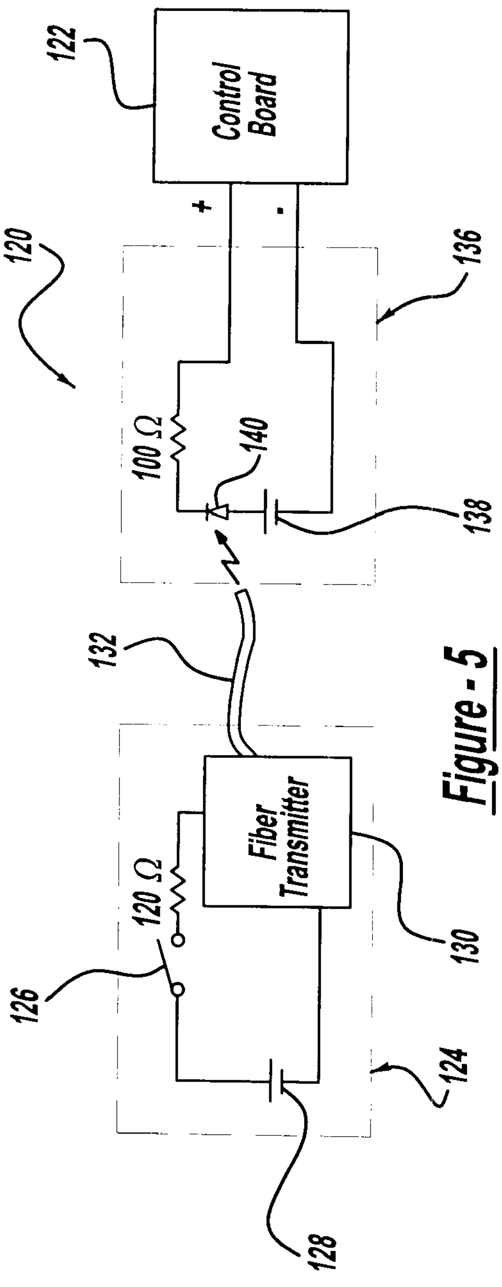
FIG. 5 is a schematic block diagram of a switching system for a valve assembly that employs an optical switch device, according to another embodiment of the present invention.

FIG. 5 shows a schematic block diagram of another valve switching system 120 for activating the valve 18 in the manner discussed herein. The system 120 includes a control board 122 that operates with a 1.2 volt signal to activate the piezo-electric element in the assembly 38. The switching system 120 includes an optical transmitter circuit 124 that includes a manual switch 126, a DC voltage source 128, for example a 9 volt DC source, and a fiber transmitter 130, such as an LED. When the switch 126 is closed, the voltage provided by the source 128 causes the transmitter 130 to transmit light down a fiber optic cable 132.

The system 120 further includes a switch assembly 136 including a DC voltage source 138, such as a 1.5 DC voltage source, and a photodiode 140. When the photodiode 140 receives light from an end of the optical cable 132 opposite the transmitter 130, it conducts which causes the DC voltage from the source 138 to energize the control board 122. As above, the control board 122 activates the piezo-electric element in the assembly 38 which controls the pilot valve 36. The switch assembly 136 and the control board 122 can be internal to the assembly 38.

Figure 6:
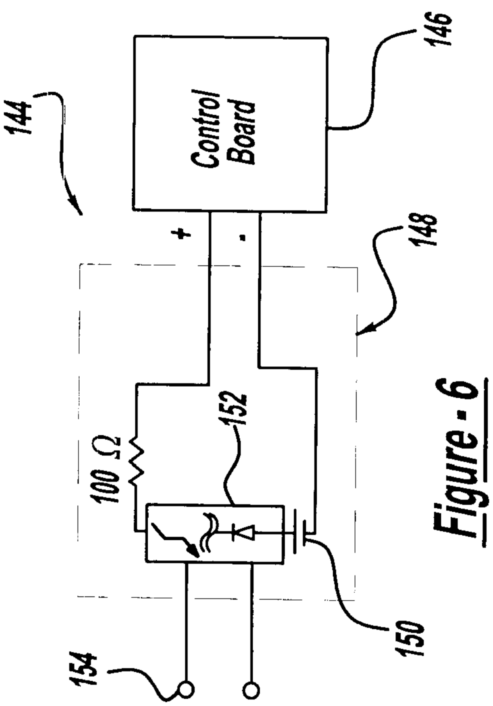
FIG. 6 is a schematic block diagram of a switching system for a valve assembly that employs an opto-coupler switch device, according to another embodiment of the present invention.

In accordance with another low voltage application, FIG. 6 shows a schematic block diagram of a valve switching system 144 having a control board 146 that is the same as the control board 122, and a switch assembly 148 similar to the switch assembly 136. The switch assembly 148 includes a DC voltage source 150 and an opto-coupler 152 that replaces the photodiode 140. The opto-coupler 152 receives a low voltage signal from a suitable voltage source 154 that causes the opto-coupler 152 to conduct and energize the control board 146.

Figure 7:
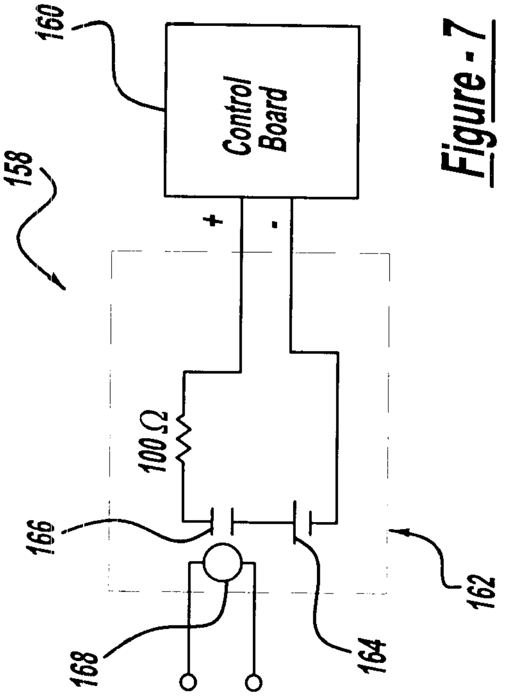
FIG. 7 is a schematic block diagram of a switching system for a valve assembly that employs an infrared switch device, according to another embodiment of the present invention.

FIG. 7 is a schematic block diagram of a valve switching system 158 that includes a control board 160 that is the same as the control boards 122 and 146 above, and a switch assembly 162 that is similar to the switch assemblies 136 and 148. The switch assembly 162 includes a DC voltage source 164, a capacitor 166 and an infrared source 168. A low voltage signal is applied to the infrared source 168 that causes the capacitor 166 to conduct which energizes the control board 160.

While the invention has been described in its presently preferred form, it is to be understood that there are numerous applications and implementations for the present invention. Accordingly, the invention is capable of modification and changes without departing from the spirit of the invention as set forth in the appended claims.

What is claimed is:

1. A system for controlling an actuator that controls volatile chemical flow, comprising:

an optical source generating an optical source signal that is received by at least one solar cell, the solar cell generating an electrical valve control signal in response to the optical signal;

a pilot valve including a low voltage element, said low voltage element being responsive to the electrical valve control signal, an amplifier circuit amplifying the electrical valve control signal prior to the electrical valve control signal being applied to the low voltage element;

said pilot valve controlling a pilot air pressure in response to the electrical valve control signal; and a main valve responsive to the pilot air pressure, said main valve applying a working air pressure to displace a pneumatic rotary operator associated with the actuator to control the flow of the volatile chemical.

2. The system according to claim 1 wherein the amplifier circuit amplifies the electrical valve control signal to about 7.5 volts.

3. The system according to claim 1 wherein the low voltage element is a piezo-electric element.

4. The system according to claim 1 wherein the low voltage element is a ceramic element.

5. The system according to claim 1 wherein the actuator is a chemical fluid flow valve.

6. The system according to claim 1, wherein the solar cell is a type of optical device that is part of a switch assembly, the switch assembly including a DC power source, said DC power source providing the electrical valve control signal to said optical device and said optical device passing said electrical valve control signal in response to a switch signal.

7. The system according to claim 6 wherein the optical device is a photodiode and the switch signal is an optical signal.

8. The system according to claim 6 wherein the optical device is an opto-coupler and the switch signal is a low voltage signal.

9. The system according to claim 6 wherein the optical device is an infrared device and the switch signal is a low voltage signal.

10. The system according to claim 6 wherein the switching assembly further includes an optical transmitter device, said optical transmitter device generating the switch signal.

11. The system according to claim 10 wherein the optical transmitter device includes an optical transmitter, a DC voltage source and a manual switch, said manual switch being activated to cause the DC voltage source to energize the optical transmitter and generate the switch signal.

12. A valve system in a chemical management system for controlling flow of a volatile chemical, comprising:

a remote transmitter, said transmitter generating a valve activation signal;

a receiver, said receiver generating a piezo-electric element signal in response to the activation signal;

an assembly including a piezo element, said assembly generating a pilot signal in response to the piezo element signal;

a pilot valve, said pilot valve passing a pilot air pressure in response to the pilot signal;

a main valve, said main valve generating a working air pressure in response to the pilot air pressure;

a pneumatic rotary operator responsive to the working air pressure; and a fluid flow valve controlling the flow of the volatile chemical from a first side to a second side, said fluid flow valve being displaced by the pneumatic rotary operator.

13. The system according to claim 12, wherein the receiver is part of a switch circuit that further includes a photodiode and the remote transmitter is an optical transmitter, said photodiode being positioned on an electrical line between at least one solar cell and the piezo element, said photodiode being responsive to an optical signal acting as the valve activation signal from the optical transmitter, said photodiode conducting in response to the optical signal to allow the piezo-electrical element signal to energize the piezo element.

14. The system according to claim 12, wherein the transmitter is an RF transmitter, the valve activation signal is an RF signal and the receiver is an RF receiver.

15. The system according to claim 12, wherein the remote transmitter includes an optical transmitter, a DC voltage source and a manual switch, said manual switch being activated to cause the DC voltage source to energize the optical transmitter and generate the valve activation signal.

16. The system according to claim 12 wherein the transmitter is an optical transmitter, the activation signal is an optical signal and the receiver is an optical detector.

17. The system according to claim 16 wherein the optical detector is selected from the group consisting of photodiodes and solar cells.

18. The system according to claim 16 wherein the transmitter is selected from the group consisting of infrared devices, LED devices and light sources.

19. The system according to claim 12, wherein the transmitter is an optical transmitter circuit that includes an optical device and a DC power source, said DC power source providing the valve activation signal and said optical device passing the valve activation signal in response to a transmitter signal.

20. The system according to claim 19 wherein the optical device is a photodiode and the transmitter signal is an optical signal.

21. The system according to claim 19 wherein the optical device is an opto-coupler and the switch signal is a low voltage signal.

22. The system according to claim 19 wherein the optical device is an infrared device and the switch signal is a low voltage signal.

* * * * *